| United States Patent [19] | [11] | 4,118,458 |
|---|---|---|
| Robinson | [45] | Oct. 3, 1978 |

[54] SEPARATING MAGNESIUM AND CALCIUM FROM MINERAL MIXTURES CONTAINING ZINC SULPHIDES

[76] Inventor: Murry C. Robinson, 178 Brookbanks Dr., Don Mills, Ontario, Canada

[21] Appl. No.: 834,744

[22] Filed: Sep. 19, 1977

Related U.S. Application Data

[63] Continuation of Ser. No. 359,322, May 11, 1973, abandoned.

[30] Foreign Application Priority Data

May 12, 1972 [GB] United Kingdom ............... 22521/72

[51] Int. Cl.² .............................................. C01G 9/08
[52] U.S. Cl. ..................................... 423/109; 423/155
[58] Field of Search ............... 423/109, 155, 164, 173; 75/101 R, 120, 1

[56] References Cited

U.S. PATENT DOCUMENTS

| 1,799,166 | 4/1931 | Hooey ................................. 423/109 |
| 3,025,131 | 3/1962 | Lerner ................................. 423/173 |
| 3,085,858 | 4/1963 | Trubey et al. ....................... 423/164 |

*Primary Examiner*—Brian Hearn

[57] ABSTRACT

Ores or mineral mixtures containing zinc sulphides and magnesium and/or calcium in the form of carbonates, oxides and/or hydroxides are leached with an aqueous sulphur dioxide bearing solution to selectively dissolve magnesium and/or calcium leaving the zinc sulphides in the undissolved residue in concentrated form. During the dissolution reaction, the pH is maintained within the range of about 1 to about 4 by the addition of sulphur dioxide to the leach solution at a rate at least sufficient to replace sulphur dioxide taken up in the dissolution of magnesium and/or calcium thereby promoting selective dissolution of the magnesium and calcium compounds and non-dissolution of the zinc sulphides.

7 Claims, No Drawings

SEPARATING MAGNESIUM AND CALCIUM FROM MINERAL MIXTURES CONTAINING ZINC SULPHIDES

This is a continuation of application Ser. No. 359,322, filed May 11, 1973 now abandoned.

The present invention relates to a process for treating ores or mineral mixtures containing calcium and/or magnesium and/or certain heavy metals in the form of carbonates, oxides and/or hydroxides together with zinc sulphides with or without silica and/or silicates.

Typically minerals (either ores or concentrates) which it is desired to treat by the process of the present invention contain:

(a) carbonates and/or hydroxides and/or oxides of elements such as magnesium, calcium and zinc, for example: calcite, magnesite, brucite, dolomite, hydrozincite and/or concentrated or calcined products of any or all these materials or minerals, and (b) sulphides such as sphalerite and marmatite.

The process is intended to effect separation of type (a) from type (b) minerals so that type (b) will then exist in a more concentrated form. In particular, this will assist in the recovery of the zinc values present in instances where this may not be economically possible by conventional means.

The present invention is directed to a process which enables some or all of the calcium and magnesium to be removed without dissolution of an economically significant fraction of the zinc sulphide minerals present so that these minerals may be concentrated with any insoluble silicates or other residual materials to the degree that the latter are present in the ore. In particular, the present invention is directed to a process in which the concentration of the zinc sulphide content of an ore consisting largely of calcium and/or magnesium carbonates is carried out below 100° C.

The present invention is based on the discoveries that by careful control of the pH and total sulphur dioxide concentrations in an aqueous leaching media, the dissolution of calcium and magnesium carbonates and oxides may proceed at rapid rate whilst the dissolution of zinc sulphides, such as sphalerite, proceed at such a slow rate that the amount of zinc as sulphides going into solution with the calcium and magnesium is a very small proportion of the total zinc sulphide present. The expression "total sulphur dioxide concentration" as used herein means sulphur dioxide present in solution as dissolved metal bisulphites and monosulphites as well as free sulphur dioxide dissolved in the solution.

In the process, the ore or mineral mixture may be in headsize rock form or may be crushed and/or ground. The leaching may be effected either by means of passing a stream of leaching liquid and sulphur dioxide gas countercurrent through headsize rock in towers or by passing a regulated quantity of sulphur dioxide gas into a slurry of the crushed or ground material in digestion vessels. In the process, calcium and magnesium carbonates and hydroxides are dissolved by the leaching solution at a temperature below about 100° C. The pH of the leaching solution is maintained within the range of 1.0 to 4.0 by the provision of sulphur dioxide to the leaching operation at a rate at least sufficient to replace the free sulphur dioxide taken up in the dissolution of calcium and magnesium as bisulphites. A high total sulphur dioxide concentration is to be avoided because it tends to increase the dissolution rate of zinc present as sulphides. As the exhaustion of the calcium and magnesium values approaches, the proportion of zinc, as sulphide, to calcium and magnesium values taken into solution in a given time will tend to rise and the point at which the treatment of the carbonate ore with sulphur dioxide under the stated conditions is terminated will, to some extent, depend on the reaction and solution rate of the sulphide content of the carbonate ore under the selected process conditions.

In a typical application of the process, the ground ore or mineral mixture is suspended as a slurry in a carrier liquid, which may be sulphur dioxide acidulated water or other aqueous liquids that will act as a carrier of sulphur dioxide, such as a waste sulphite liquor as produced using such liquor in the digestion of wood in pulp production. Large quantities of calcium bisulphite and/or magnesium bisulphite liquors are produced annually for use in processing wood pulp and the process of the present invention might be conveniently carried out in conjunction with the production of such pulp cooking liquors.

Sulphur dioxide gas is introduced to the agitated slurry at a rate to control the pH of the slurry or leaching solution at a value between about 1 and about 4, preferably between about 1.7 and about 3.5 and even more preferably between about 1.7 and about 2.5. At pH values of about 1.0 and less, the rate of magnesium and calcium dissolution is rapid but the dissolution rate of zinc sulphides is also relatively high thereby diminishing the selectivity of the process. At pH values of about 4.0 and higher, the dissolution rate of zinc sulphides is extremely low, thus making the process highly selective but the magnesium and calcium dissolution rates are relatively slow. The preferred mode of operation of the process is to maintain the pH between about 1.7 and about 2.5 while, at the same time, maintaining the total sulphur dioxide at the lowest possible level consistent with satisfactory dissolution rates for magnesium and calcium. It has been found, for example, that at certain fixed pH values, extraction of zinc sulphides tends to increase with increasing total sulphur dioxide concentration. At a pH of about 2.5, total sulphur dioxide should be maintained below about 100 g.p.l. and preferably above about 20 g.p.l. At a pH of about 1.7, total sulphur dioxide should be maintained below about 90 g/l and preferably above about 45 g/l.

It is perfectly acceptable to heat the slurry to 60° C. or even higher during leaching but in some cases it may be preferred to carry out the process in two stages with one stage at a temperature in the range of about 15° C. to about 25° C. without provision of heat from an extraneous source.

After allowing sufficient time for the major portion of the reactive calcium and magnesium to dissolve under the process conditions, the undissolved residue containing the zinc sulphides in concentrated form, is separated from the solution by decantation or other liquid-solid separation technique.

In succeeding steps, the zinc sulphide concentrate may then be treated by conventional roasting which would release sulphur dioxide to provide at least part of the requirements for sulphur dioxide for dissolution of the magnesium and/or calcium carbonates, hydroxides and/or oxides.

The separated leach solution, containing the major part of the calcium and magnesium values (and in consequence the major part of the sulphur dioxide used in the process), can be treated by conventional or unconventional methods to recover at least a portion of the sulphur dioxide used for recycle to the leaching step of the process.

The process has been found to be particularly applicablt to the recovery of zinc values found in the form of zinc sulphides in association with calcium and magnesium carbonates and magnesium hydroxide. Sphalerite (zinc sulphide) is often found in rocks or ores containing large quantities of dolomite and, in some cases, calcite. Such ores or mineral mixtures could be treated by the process of the invention as is or after pre-concentration by heavy media separation, jigging or other means of physical separation.

The invention is further explained and illustrated by the following Examples.

EXAMPLE 1

In one series of experiments, an aqueous slurry of a synthetic mixture comprising 7.75% ZnS, 75% dolomite and 17.25% calcite was employed since this is typical of naturally occurring ores of interest. This synthetic mixture was composed of finely ground dolomite and calcite (−270 mesh) and laboratory grade zinc sulphide. It was slurried in water at 65 gms/liter, thus providing about 15 gms/litre dissolvable calcium and 6.5 gms/liter dissolvable magnesium.

The slurry was treated with sulphur dioxide without heating or the addition of other chemicals, whilst the pH of the slurry was maintained at constant value. The solution of the metal values was determined at intervals and the amounts of each metal dissolved is indicated below in gms/liter.

| pH | | Time | | |
|---|---|---|---|---|
| | | 30 minutes | 60 minutes | 90 minutes |
| 1.25 | Ca | 11.5 | 12.9 | 13.5 |
| | Mg | 4.8 | 5.7 | 6.0 |
| | Zn | 0.25 | 0.4 | 0.5 |
| 1.5 | Ca | 11.0 | 12.5 | 13.2 |
| | Mg | 4.5 | 5.5 | 5.8 |
| | Zn | 0.15 | 0.2 | 0.25 |
| 2.0 | Ca | 9.0 | 10.2 | 10.9 |
| | Mg | 3.2 | 4.0 | 4.5 |
| | Zn | 0.07 | 0.12 | 0.13 |
| 2.5 | Ca | 7.5 | 9.0 | 10.0 |
| | Mg | 2.5 | 3.0 | 3.6 |
| | Zn | 0.05 | 0.06 | 0.06 |

It will be seen from the above figures that at the higher pH values of 2.0 and 2.5, the rate of solution of ZnS is so low that the treatment for removal of calcium and magnesium values might be continued for very long periods, for example 4–8 hours, without loss of significant quantities of ZnS. However, at pH 1.25, the solution rate of zinc sulphide over 90 mins. is approximately five to ten times as great as at pH 2.5.

Thus, although the rate of solution of magnesium and calcium also increases as the pH is reduced to 1.25, it will be seen that a significant increase in concentration of the zinc values occurs with this latter treatment.

EXAMPLE 2

A sample of naturally occurring sphalerite (zinc sulphide) in a dolomite host rock, as found in Ontario, Canada, was ground for experimental purposes. The sample analyzed (wt. %): 18.9% Ca, 11.3% Mg, 7.6% Zn and 0.25% Fe and the particle size was −200 +270 mesh.

15.0 grams of this material were slurried in 500 ml of water to give a slurry concentration of 30 g.p.l. and treated by the addition of sulphur dioxide gas at a temperature of 25° C. and a pH of 2.5. Samples of settled liquid were analyzed after 10 minutes and 30 minutes of treatment.

The results for dissolved metals in the resultant liquid were as follows:

| | | | Zn | Mg | Ca |
|---|---|---|---|---|---|
| Treatment Time | pH | Temp. ° C. | Concentration in mg per liter | | |
| 10 minutes | 2.5 | 25 | 100 | 536 | 800 |
| 30 minutes | 2.5 | 25 | 112 | 1048 | 1640 |

EXAMPLE 3

In this experiment, 12 grams of fine calcium carbonate, 1.5 grams of fine lead sulphide and 1.5 grams of laboratory grade zinc sulphide were suspended in 500 ml. of water in a beaker with constant agitation.

Sulphur dioxide was bubbled into the slurry mixture for 150 minutes at a temperature of approximately 22° C. and at a controlled pH of 1.5. At the conclusion of the experiment, the total sulphur dioxide concentration was 80.9 g.p.l.

After settling, the resultant solution was analyzed for calcium, zinc and lead by atomic absorption methods. The results obtained were: 9300 mg per liter of calcium, 372 mg per liter of zinc and 12 mg per liter of lead, thus indicating a level of extraction for calcium of approximately 97%, for zinc of approximately 18.5% and of lead of roughly 0.5%.

EXAMPLE 4

These examples show the effect of increased total $SO_2$ concentration, at the constant pH level of 1.5 and 2.5, on the dissolution rate of zinc. In these cases, the increase in the total $SO_2$ concentration at constant pH was achieved by the addition of magnesium hydroxide.

A synthetic mixture containing 7.75% zinc sulphide, 75.0% dolomite and 17.25% calcite was slurried in water to give a slurry concentration of 30 g.p.l. The zinc sulphide was laboratory grade and the dolomite and calcite particle sizes were −270 mesh. Sulphur dioxide gas was bubbled into the slurry in a constantly agitated beaker over a protracted period.

The results of experiments conducted at a temperature level of 20° C. are reported below in tabular form for two series of experiments. Analyses for zinc were made on liquids, after an adequate settling period, by atomic absorption methods. Total $SO_2$ content of the liquid as reported was determined by automatic titration methods. The higher levels of total $SO_2$ concentration at a given pH level were attained by adding $Mg(OH)_2$ in balance with extra sulphur dioxide added.

| For pH Level of 1.5 | | | | |
|---|---|---|---|---|
| | Series I | | Series II | |
| Reaction Time Minutes | Total $SO_2$ Conc. g.p.l. | Zn Conc. mg per liter | Total $SO_2$ Conc. g.p.l. | Zn Conc. mg per liter |
| 30 | 46 | 70 | 40 | 73 |
| 60 | 42 | 91 | 78 | 116 |
| 90 | 53 | 112 | 109 | 147 |
| 120 | 50 | 137 | 133 | 168 |
| 150 | 57 | 148 | 166 | 186 |
| For pH Level of 2.5 | | | | |
| | Series I | | Series II | |
| Reaction Time Minutes | Total $SO_2$ Conc. g.p.l. | Zn Conc. mg per liter | Total $SO_2$ Conc. g.p.l. | Zn Conc. mg per liter |
| 30 | 15 | 28 | 17 | 28 |
| 60 | 20 | 32 | 43 | 42 |

-continued

| 90 | 23 | 35 | 75 | 70 |
| 120 | 25 | 39 | 100 | 81 |
| 150 | 27 | 42 | 124 | 98 |

Other series of experiments were performed in a similar manner at pH levels of 1.5 and 2.5 at room temperature wherein the total SO$_2$ concentration was increased at constant pH by adding Ca(OH)$_2$ rather than Mg(OH)$_2$ to the agitated mixture. These experiments also showed an increase in zinc concentration in solution at constant pH levels as the total SO$_2$ concentration was increased, thus demonstrating the need for close control of total SO$_2$ concentration for optimum selectivity in the process.

What I claim as new and desire to protect by Letters Patent of the United States is:

1. The process for treating a mineral mixture containing zinc sulphides and at least one of magnesium and calcium in the form of carbonates, oxides or hydroxides to effect separation of at least a part of said magnesium and calcium constituents from said zinc sulphides which comprises leaching said mineral mixture with an aqueous sulphur dioxide bearing solution at a temperature below 100° C. to put magnesium and calcium into solution as bisulphites, continuously adding sulphur dioxide to said solution during said leaching at a rate sufficient to maintain the pH thereof at a level within the range of about 1.7 to about 2.5, maintaining the total sulphur dioxide content of the leach slurry at a level to dissolve magnesium and calcium at a preferential rate as compared to the rate of dissolution of zinc in said zinc sulphides, said total sulphur dioxide content level being between about 90 and about 45 g/l when the pH is about 1.7 and between about 20 g/l when the pH is about 2.5, and containing said leaching with said sulphur dioxide addition to produce a solution containing dissolved magnesium and calcium bisulphites and a residue containing the major portion of said zinc sulphides in concentrated form and recovering said solution and residue as separate products.

2. The process according to claim 1 wherein said mineral mixture contains dolomite together with zinc in sulphidic form.

3. The process according to claim 2 wherein the mineral mixture also contains calcite.

4. The process according to claim 2 wherein the mineral mixture contains sphalerite.

5. The process according to claim 1 wherein said aqueous sulphur dioxide bearing solution is made up, at least in part, of a calcium or magnesium base waste sulphide liquor produced in conjunction with the digestion of wood in wood pulp production.

6. The process according to claim 1 wherein leaching is conducted at a temperature in the range of about 15° C. to about 25° C.

7. The process according to claim 1 wherein said mineral mixture also contains zinc in the form of a carbonate, oxide or hydroxide.

* * * * *